No. 878,512. PATENTED FEB. 11, 1908.
J. W. EMERSON.
LOGGING TRUCK.
APPLICATION FILED APR. 12, 1907.
2 SHEETS—SHEET 1.
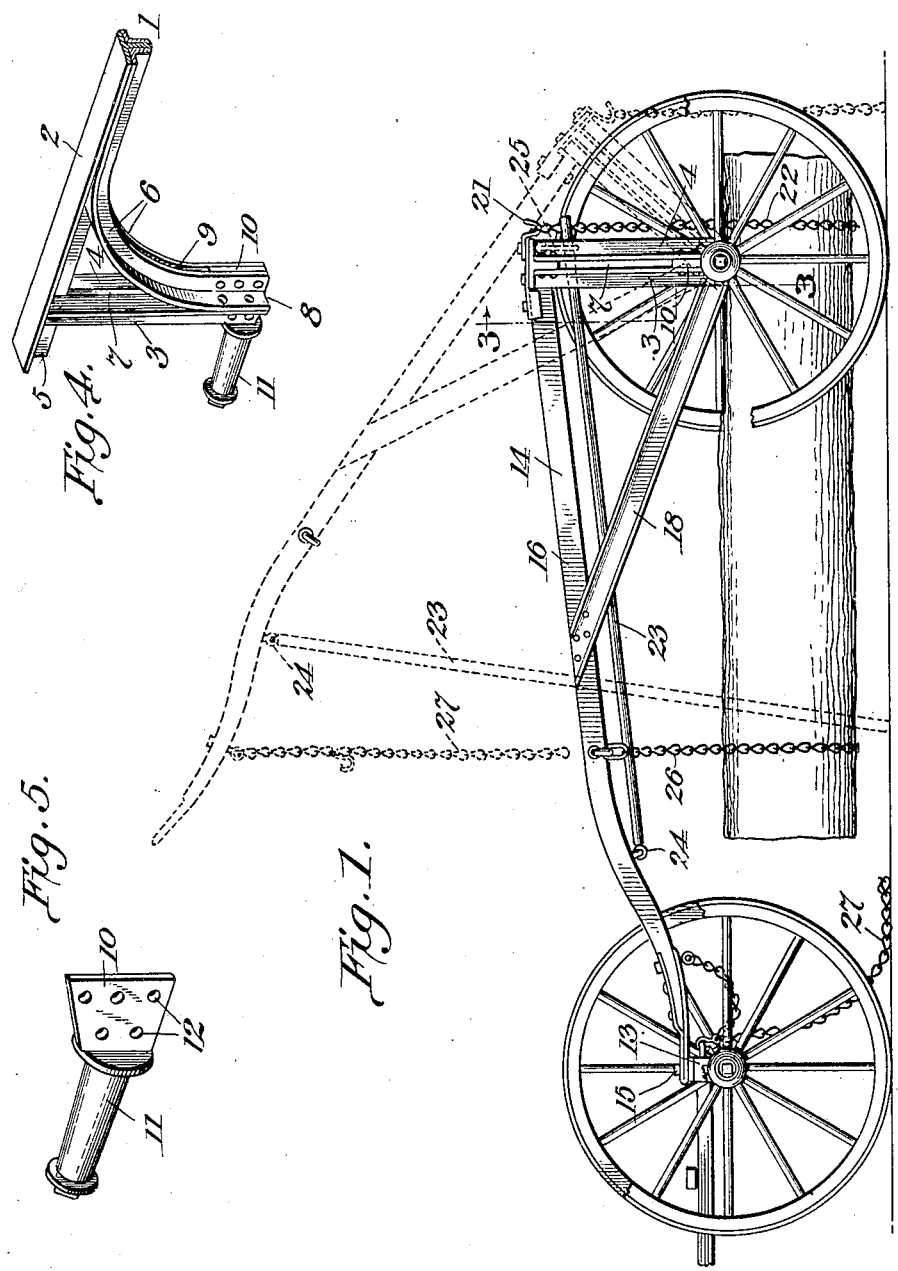
Witnesses:
T. A. Connor
H. H. Pyrne
Inventor,
John W. Emerson
By Meyers Cushman Rea
Attorneys

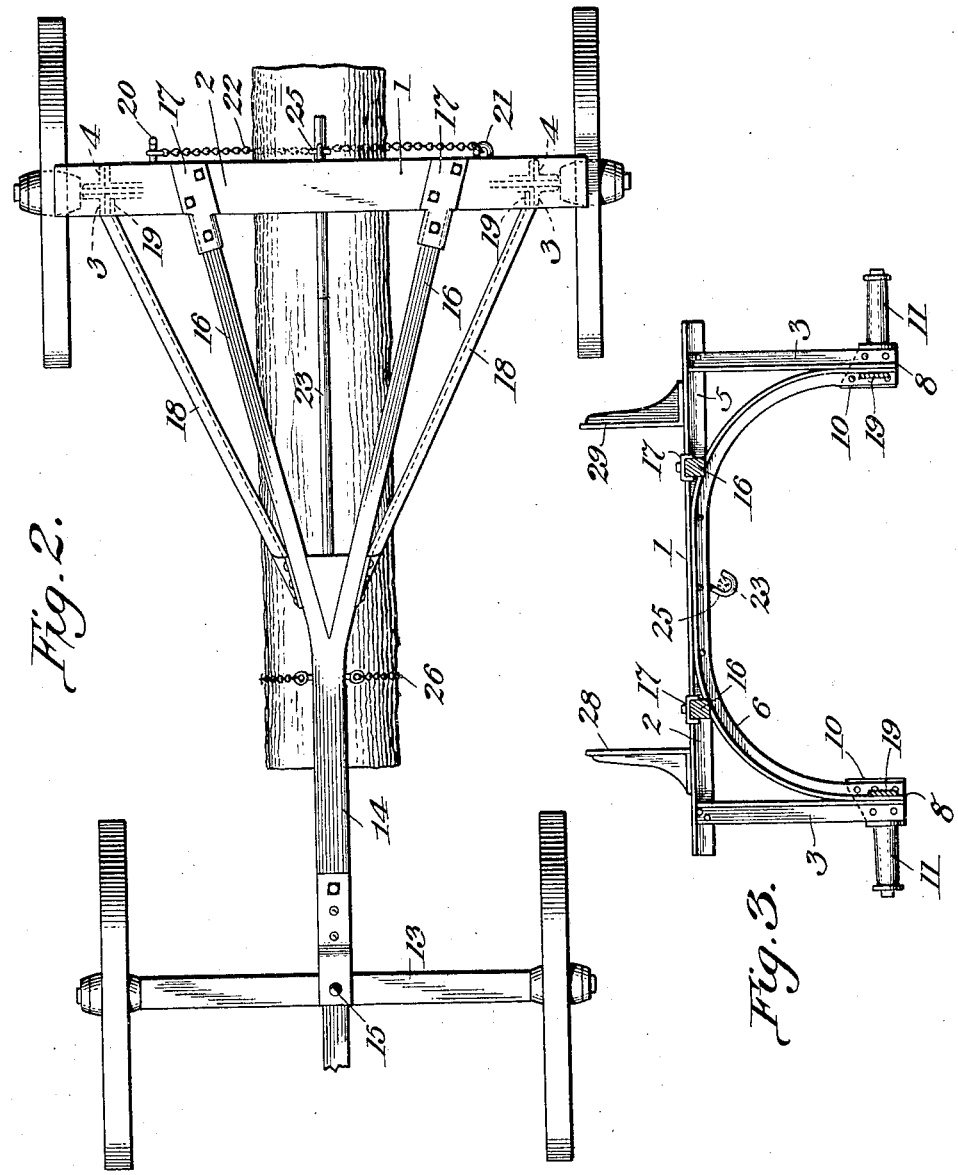

UNITED STATES PATENT OFFICE.

JOHN W. EMERSON, OF DURHAM, NORTH CAROLINA.

LOGGING-TRUCK.

No. 878,512.  Specification of Letters Patent.  Patented Feb. 11, 1908.

Application filed April 12, 1907. Serial No. 367,751.

*To all whom it may concern:*

Be it known that I, JOHN W. EMERSON, a citizen of the United States, residing at Durham, in the county of Durham and State of North Carolina, have invented new and useful Improvements in Logging-Trucks, of which the following is a specification.

My invention relates to trucks, more particularly to those of the log carrying type, and it has for its purpose to provide a truck frame which is in itself a complete article of manufacture, and which is fitted with axle skeins of a standard size whereby the frame may readily be assembled with wagon wheels of the usual kind and thus converted into a log carrying vehicle complete in all details.

For one to possess a log carrying truck complete, in addition to his usual stock of necessary vehicles, is both expensive and room taking, and since the average use of a log hauling truck is a very limited one there is no necessity for having it as a separate wagon. My aim is to overcome these objections by devising a means whereby a logging wagon may be constructed partly from the stock of vehicles used for other purposes, and in doing this the utility of those parts is increased; and likewise a saving in expense, shipment, and room for housing, is attained.

A further object resides in providing a frame of angle-iron construction, wherein by the peculiar manner in which the members thereof are assembled, the maximum degree of rigidity is attained, and the whole presents a neat and finished design.

In addition to the above advantages this invention embraces the further feature of providing a means carried by the truck whereby the same may be adjusted to various positions for loading, thus dispensing with the ordinary chain and crank mechanism for attaching the lumber.

In the accompanying drawings which illustrate the structure of my invention: Figure 1 is a side elevation of the truck in use; Fig. 2 is a top plan view thereof; Fig. 3 is a sectional view of the frame, on the line 3—3 of Fig. 1; Fig. 4 is a perspective view of a part of the bolster with the axle skein; and Fig. 5 shows a perspective view of the axle skein detached.

Referring now more particularly to the drawings in which like numerals of reference refer to corresponding parts in the different views shown, the frame consists essentially of the bolster 2 made of a single length of T-shaped angle-iron. On either end of the bolster and on opposite sides of the depending member 5 thereof are pairs of angle-iron standards or supports 3 and 4 secured thereto by bolts or otherwise, said standards having their angular edges adjacent and disposed inwardly to provide the spaces 7 therebetween as more clearly seen in Figs. 1 and 4. Within the frame thus provided are the two angle-iron braces 6 of substantially archshape, and which are secured to the bolster in a manner similar to the standards 3 and 4, and having their angular edges likewise adjacent, but outward, and fitting within the angles of the bolster and their sides meeting flush with the sides of the supports 3 and 4, as at 8. Between the members 6 of the archbeam is a space 9 of the same width as that between the supports 3 and 4, and which with said space is adapted to receive the tongue 10 of the axle skein 11. The tongue 10 has a number of perforations 12 to receive bolts which pass through the angle-bars 3 and 4, and the arch bars 6. The axles being thus detachably secured, may readily be removed when broken or worn and replaced by new ones.

Numeral 14 designates the reach which connects the rear bolster 2 with the front axle 13, of any wagon of standard size, to which it is fastened by the king bolt 15. At a point approximately midway between the bolsters the reach 14 divides into two arms 16 that extend rearwardly to either end of the bolster 2 and are connected therewith by the bolted plates 17. Adjacent the meeting point of the arms 16, and bolted on the outer sides thereof are two U-shaped brace beams 18 which extend downwardly to the arch beams 6 to which they are secured, said braces 18 having lips 19 for that purpose.

20 and 21 are the hook and eye respectively by means of which the chain 22 is suspended for supporting the log to be carried.

For adjusting the truck to lift logs of various diameters, and to the height required for moving them, the reach 14 is provided with a supporting pole 23 hinged thereto at 24; and the chain 27 is the means for drawing the reach 14 for assembling the truck, and consequently raising the log, when it has been fastened thereto.

25 represents the resting hook for the pole 23 when the same is not in use; and 26 is the chain for supporting the forward end of the log being carried.

The blocks 28 and 29 are removably secured to the rear bolster and are adapted to be applied thereto when the truck is being used for purposes other than log hauling.

What I claim as new and desire to secure by Letters Patent of the United States, is:—

1. A vehicle frame of the character described comprising a bolster and a reach therefor, pairs of vertical struts secured to said bolster, an arch beam co-extensive in height with said struts and connecting said struts with the bolster, and removable axle skeins secured to the frame at the juncture of said arch beam and the struts.

2. A vehicle frame of the character described consisting of a bolster and a reach therefor, said bolster comprising a single cross beam, pairs of vertical beams secured at either end thereof, spaces between each of said pairs, arch beams connecting said cross and vertical beams, and axle skeins fitting within the spaces of said beams and secured thereto.

3. A vehicle frame of the character described consisting of a bolster and a reach therefor, said bolster comprising a single cross beam, spaced pairs of vertical beams secured thereto, spaced arch beams connecting said cross and vertical beams, axle skeins having tongues adapted to be removably secured between the spaces of said beams, and an adjusting pole carried by the reach for supporting the frame at various positions for loading.

4. In a loading truck of the character described, a bolster, said bolster comprising a cross T-beam, a pair of vertical angle iron standards on either end and disposed to either side thereof, an arch beam secured to said standards and the T-beam, and axle skeins secured at the junction of said standards and the arch beam.

5. In a loading truck of the character described, a bolster, said bolster comprising a cross T-beam, angle supports at either end and on opposite sides thereof, an arch beam connecting said supports and the T-beam, and axle skeins secured to said supports and the arch beam.

6. In a loading truck, the combination of a bolster and a reach therefor, said bolster comprising a cross T-beam, angle-supports at either end thereof, said supports secured to opposite sides of the T-beam, an arch comprising angle-beams connecting said supports and the T-beam, axle skeins secured to said arch and supports, and brace rods connecting said arch beams and the reach.

In testimony whereof I have hereunto set my hand in presence of two subscribing witnesses.

JOHN W. EMERSON.

Witnesses:
R. H. SYKES,
W. W. MASON.